United States Patent [19]
Lai et al.

[11] Patent Number: 6,006,183
[45] Date of Patent: *Dec. 21, 1999

[54] SPEECH RECOGNITION CONFIDENCE LEVEL DISPLAY

[75] Inventors: Jennifer Ceil Lai, Garrison; John George Vergo, Yorktown Heights, both of N.Y.

[73] Assignee: International Business Machines Corp., Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/991,264

[22] Filed: Dec. 16, 1997

[51] Int. Cl.$^6$ ....................................................... G10L 5/06
[52] U.S. Cl. ........................................... 704/235; 704/251
[58] Field of Search ...................................... 704/235, 251

[56] References Cited

U.S. PATENT DOCUMENTS 5,799,273  8/1998  Mitchell et al. ......................... 704/235
5,799,276  8/1998  Komissarchik et al. ................. 704/235

OTHER PUBLICATIONS

NCC Product Comparison Table with Digital Dictate Feature Descriptions, Oct. 1995.
"NCC's Digital Dictate enhances IBM VoiceType Dictation," The Seybold Report on Desktop Publishing, vol. 9, No. 10, p. 17, Jun. 1995.
Digital Dictate Technical Manual and Installation Guide, Release 2.4, pp. iii, 17, 19, and 20, Mar. 1995.
J.R. Rhyne and G.C. Wolf, Advances in Human–Computer Interaction, "Recognition Based User Interfaces", Ablex 1993, pp. 4:216–218.

Primary Examiner—David R. Hudspeth
Assistant Examiner—Tālivaldis Ivars Šmits
Attorney, Agent, or Firm—Louis J. Percello; Rabin & Champagne P.C.

[57] ABSTRACT

A speech recognition computer system and method indicates the level of confidence that a speech recognizer has in it recognition of one or more displayed words. The system and method allow for the rapid identification of speech recognition errors. A plurality of confidence levels of individual recognized words may be visually indicated. Additionally, the system and method allow the user of the system to select threshold levels to determine when the visual indication occurs.

31 Claims, 3 Drawing Sheets

SPEECH RECOGNITION CONFIDENCE LEVEL DISPLAY

BACKGROUND OF THE INVENTION

1. Field of the Invention

This invention relates to the field of speech recognition systems. More specifically, this invention relates to user inteifaces for speech recognition systems, and yet more specifically to a method and apparatus for assisting a user in reviewing transcription results from a speech recognition dictation system.

2. Description of the Related Art

Text processing systems, e.g. word processors with spell checkers, such as Lotus WordPro™ and Word Perfect™ by Novell, can display misspelled words (i.e. words not recognized by a dictionary internal to the word processor) in a color different from that of the normal text. As a variant, Microsoft Word™ underlines misspelled words in a color different from that of the normal text. In these cases, it is simple to ascertain the validity of a word by checking it against dictionaries. Either a word is correctly spelled or it is not. However, these aspects of known text processing systems deal only with possible spelling errors. Additionally, because spellcheckers in text processing systems use only a binary, true/false criterion to determine whether a word is correctly (or possibly incorrectly) spelled, these systems will choose one of two colors in which to display the word. In other words, there are no shades of gray. The word is merely displayed in one color if it is correctly spelled and in a second color if the system suspects the word is incorrectly spelled. Grammar checking systems operate similarly, in that the system will choose one of two colors in which to display the text depending upon whether the system determines that correct grammar has been used.

By contrast, the inventive method and apparatus deal with speech recognition errors, and in particular with levels of confidence that a speech recognition system has in recognizing words that are spoken by a user. With the method and apparatus of the present invention, an indication is produced, which is correlated to a speech recognition engine's calculated probability that it has correctly recognized a word. Whether or not a word has been correctly recognized, the displayed word will always be correctly spelled. Additionally, the inventive system supports multiple levels of criteria in determining how to display a word by providing a multilevel confidence display.

In another area, known data visualization systems use color and other visual attributes to communicate quantitative information. For example, an electroencephalograph (EEG) system may display a color contour map of the brain, where color is an indication of amplitude of electrical activity. Additionally, meteorological systems display maps where rainfall amounts or temperatures may be indicated by different colors. Contour maps display altitudes and depths in corresponding ranges of colors. However, such data visualization systems have not been applied to text, or more specifically, to text created by a speech recognition/dictation system.

In yet another area, several speech recognition dictation systems have the capability of recognizing a spoken command. For example, a person dictating text, may dictate commands, such as "Underline this section of text", or "Print this document". In these cases, when the match between the incoming acoustic signal and the decoded text has a low confidence score, the spoken command is flagged as being unrecognized. In such a circumstance, the system will display an indication over the user interface, e.g. a question mark or some comment such as "Pardon Me?". However, obviously such systems merely indicate whether a spoken command is recognized and are, therefore, binary, rather than multilevel, in nature. In the example just given, the system indicates that it is unable to carry out the user's command. Thus, the user must take some action. Such systems fail to deal with the issue of displaying text in a manner that reflects the system's varying level of confidence in its ability to comply with a command.

In yet another area, J. R. Rhyne and G. C. Wolf's chapter entitled "Recognition Based User Interfaces," published in *Advances in Human-Computer Interaction*, 4:216–218, Ablex, 1993, R. Hartson and D. Hix, editors, states "the interface may highlight the result just when the resemblance between the recognition alternatives are close and the probability of a substitution error is high." However, this is just another instance of using binary criteria and is to be contrasted with the multilevel confidence display of the present invention. Furthermore, this reference merely deals with substitution error and lacks user control, unlike the present invention which addresses not only substitution errors but also deletion errors, insertion errors, and additionally, provides for user control.

Traditionally, when users dictate text using speech recognition technology, recognition errors are hard to detect. The user typically has to read the entire dictated document carefully word by word, looking for insertions, deletions and substitutions. For example, the sentence "there are no signs of cancer" can become "there are signs of cancer" through a deletion error. This type of error can be easy to miss when quickly proof reading a document.

It would be desirable to provide a system that displays transcribed text in accordance with the system's level of confidence that the transcription is accurate. It also would be desirable if such a system could display more than a binary indication of its level of confidence.

SUMMARY OF THE INVENTION

The failings of the prior art are overcome by the present invention which has as its objectives the following.

An object of this invention is an improved speech recognition system interface.

Another object of this invention is a speech recognition interface that indicates to a user the level of confidence a speech engine has in the recognized text.

Another object of this invention is an end user control which allows for the setting of confidence levels of displayed text recognized by a speech engine in a speech recognition interface.

The present invention relates to a speech recognition computer system and method that indicates the level of confidence that a speech recognizer has in one or more displayed words. The level of confidence is indicated using an indicator, such as color, associated with the word or words that are displayed on a user interface. The system has a voice input device, such as a microphone, that inputs acoustic signals to the speech recognizer. The speech recognizer translates the acoustic signal from the voice input device into text, e.g. one or more words. A confidence level process in the speech recognizer produces a score (confidence level) for each word that is recognized. A confidence level indicator process then produces one, of one or more indications, associated with each of the one or more words displayed on the user interface. The indication is related to one of one or more sub-ranges, in which the score falls. The words are displayed on a user interface as text with the properties of the text (e.g. color) reflecting the confidence score.

BRIEF DESCRIPTION OF THE DRAWINGS

The foregoing and other objects and features of the present invention now will be described in detail with reference to the accompanying drawings, in which.

DETAILED DESCRIPTION OF A PREFERRED EMBODIMENT

Figure 1:
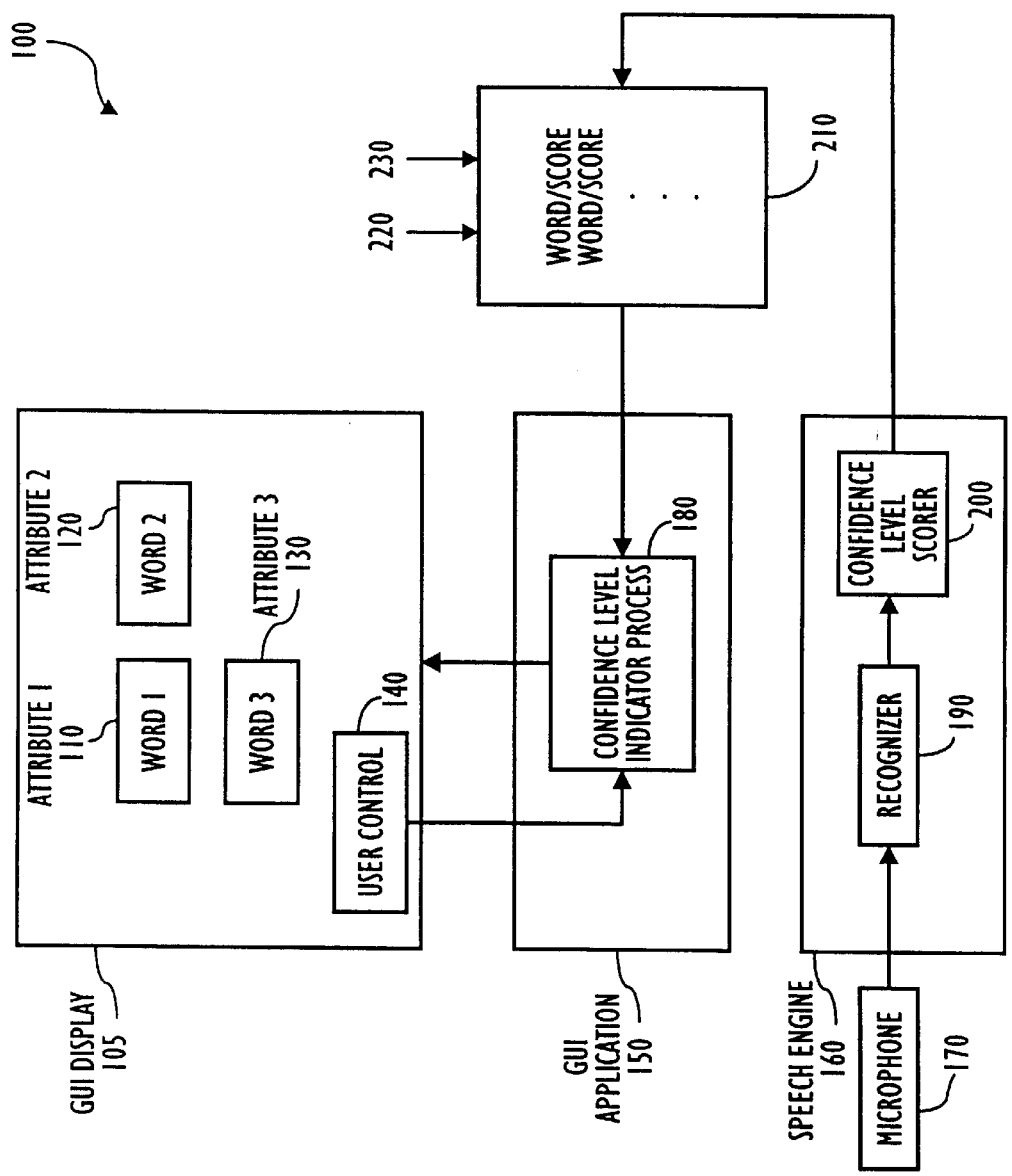
FIG. 1 is a block diagram of a preferred embodiment of the present invention.

FIG. 1 shows a system and method for displaying words with attributes that are conelated to confidence levels. A human speaker talks into a microphone (170). The microphone transmits an acoustic (speech) signal to a speech engine process (160). The speech engine process may be either software or a combination of software and hardware, which digitizes the incoming acoustic signal and performs a recognition function (190). The recognition function (190) translates the acoustic signal into text, i.e. one or more words. This recognition and translation may be accomplished in a number of different ways which are well known to those in the field. Each word is assigned a confidence level score by a confidence level scorer (200). This confidence level score is assigned using an algorithm to determine the level of accuracy with which the recognizer (190) determines it has translated the acoustic (speech) signal to text. Each word and its assigned confidence level score form a word/score (210) pair, each of which is sent to a graphical user interface (GUI) application (150). The GUI application (150) may receive information from a user control (140) to enable a user of the system to select score thresholds, above which (or below which) default attributes are used in displaying the words. The user may also provide information, via the use control (140), to control which color maps and/or attribute maps are used to display the words. The use of the thresholds and maps will be discussed in more detail below.

Having received the word/score pairs, GUI application (150) uses a Confidence Level Indicator Process (CLIP) (180) along with information from the user control (140), if any, to assign a color and/or an attribute to each word (110, 120, 130). The CLIP is a mapping algorithm which takes the score which was assigned by the confidence level scorer (200) and determines what color and/or attribute should be associated with that score. The resulting color and/or attribute used to display the word then reflects the level of accuracy with which the recognizer determines it has translated the acoustic (speech) signal into text.

The color selected might be from a map of a range of different colors or might be from a map of different shades of a single color. Additionally, the attribute selected may include features such as font type, point size, bold, italics, underline, double underline, capitalization, flashing, blinking, or a combination of any of these features. Once a word and its associated color and/or attribute are determined for each word, the pairs are then displayed on an output device (105), with each word being displayed with its associated color and/or attribute (110, 120, 130).

Figure 2:
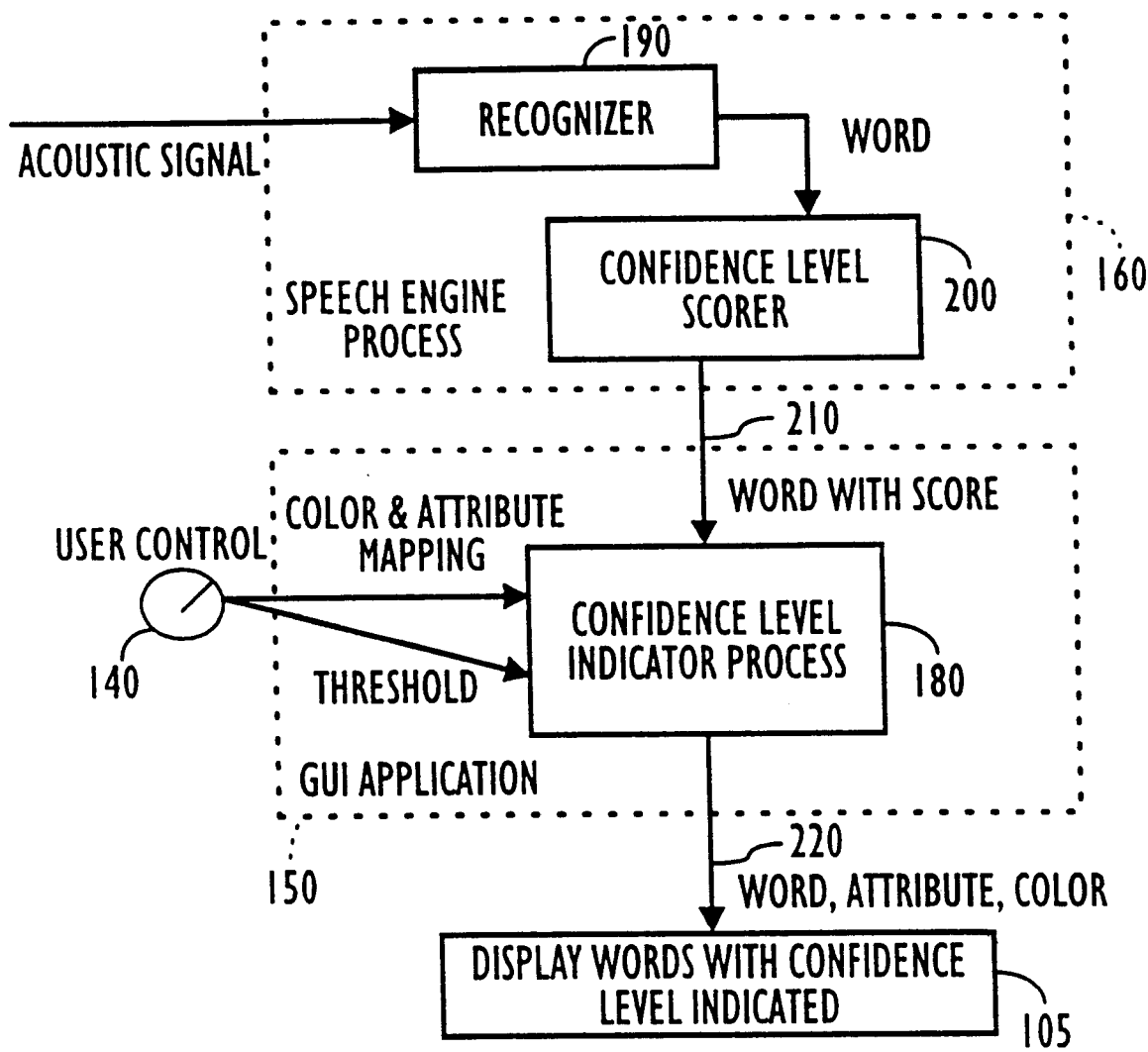
FIG. 2 is a flow chart which shows the steps carried out in the system depicted in FIG. 1.

FIG. 2 shows, in a flow chart form, the steps which are carried out in the embodiment described in connection with FIG. 1. FIG. 2 shows that the acoustic (speech) signal generated by a speaker speaking into a microphone is sent to the speech engine process (160) containing a recognizer (190) for decoding the acoustic signal to text or words as well as a confidence level scorer (200) for assigning a score to the words. This score reflects the level of confidence the speech recognition system has in its translation of the processed acoustic signals. Each word, with its associated score is then sent from the confidence level scorer (200) in the speech engine process (160) to graphical user application (150). The graphical user application (150) may accept information from the user control (140) to control the threshold and color and/or attribute mapping and use that information in the CLIP (180) within the graphical user application (150). The CLIP (180) then assigns a color and/or attribute to each word based upon the score given to each word and based upon the information from the user, if any. Thus, the graphical user interface application (150) has as its output each word with an associated color and/or attribute. This information is then used to display the word with the associated color and/or attribute, which, in turn, is an indication of the confidence level associated with each word.

Figure 3:
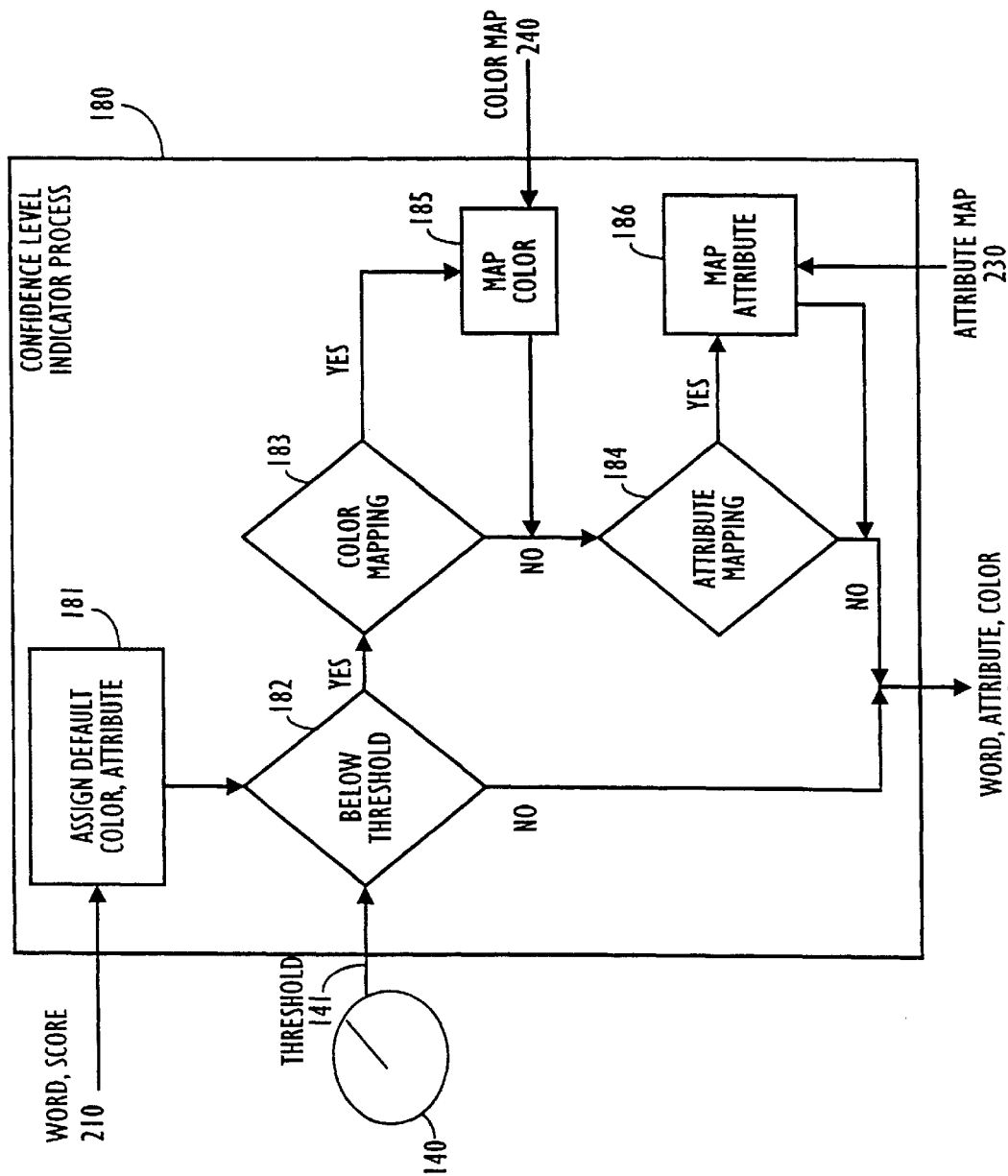
FIG. 3 is a flow chart which provides greater detail of the confidence level indicator process.

FIG. 3 depicts a flow chart showing more detail of CLIP (180 in FIGS. 1 and 2). A word/score pair (210) is received by the CLIP (180) which assigns a default color and font attribute to the word (181). The word and its score are reviewed (182). If the word is above the threshold it is displayed with the default color and attribute (220). If the score is below the threshold (141), which may be defined by a user or defined by the system, the word and its associated score go to a process that checks for color mapping (183). When a color map (240) is used, the appropriate color (determined by the word's score) is mapped to the word (185). Irrespective of whether color mapping is used, the process checks whether the attribute mapping of the word needs to be changed based on the score (184). If so, the attribute mapping process (184) maps the correct font attribute based on the score (186) using an attribute map (230). The word, with color and attribute if appropriate, then are displayed (220).

Variants to the invention are possible. For example, in the flow chart of FIG. 3, color and/or attribute mapping may be carried out if the word/score pair is above, rather than below a threshold. Also, color mapping or attribute mapping may be canried out alone, rather than serially. That is, either color mapping or attribute mapping may be used alone.

Although the present invention has been described with reference to a specific embodiment, many modifications and variations therein will be readily apparent to those of working skill in this technological field. Accordingly, all such variations and modifications are included within the scope of the present invention as defined by the following claims.

We claim:

1. A speech recognition system comprising:
  a speech recognizer for translating speech into text, said text being one or more sentences, said speech recognizer further comprising a confidence level scorer for assigning one of a selected number of possible scores for each word of said one or more sentences, said score being a confidence measure that each said word has been recognized correctly;
  a user interface for displaying said text, said each word having display properties based on said scores and providing a visual indication of said confidence measure for said each word, wherein said display properties include a default display property and two or more other display properties; and a user control which allows a user of said speech recognition system to select said number and define a score threshold for displaying said default display property.

2. A speech recognition system according to claim 1, wherein said default display property is normal text.

3. A speech recognition system according to claim 1, wherein said each word is displayed with one of said two or more other display properties when said confidence measure is below said score threshold, thereby indicating a possible error.

4. A speech recognition system according to claim 3, wherein said score threshold is an upper limit of said number of thresholds selected by said user, said thresholds defining a plurality of sub-ranges, each of said display properties corresponding to one of said defined sub-ranges.

5. A speech recognition system according to claim 1, wherein said each word is displayed with said default display property when said confidence measure is above said score threshold level.

6. A speech recognition system according to claim 1, wherein said default display property corresponds to scores above said threshold score and each of said two or more other display properties correspond to different ones of said selected number of possible scores.

7. A speech recognition system comprising:

a speech recognizer for translating speech into text, said text being one or more sentences, said speech recognizer comprising a confidence level scorer for assigning one of a user selected number possible scores for each word of said one or more sentences;

a user interface for displaying said text based on said scores, wherein said scores cause said each word to be displayed in accordance with one of a user selected number of indications, each of said indications indicating into which of a selected number of sub-ranges said scores fall; and a user control which allows a user of said speech recognition system to select said number of sub-ranges and boundaries of each sub-range.

8. A speech recognition system according to claim 7, wherein each of said indications is a different color.

9. A speech recognition system according to claim 7, wherein each of said indications is at least one different font attribute selected from the group consisting of font type, point size, bold, italics, underline, double underline, capitalization, flashing and blinking.

10. A speech recognition system according to claim 7, wherein each of indications is one of a different shade of a single color or a different shade of gray.

11. A speech recognition system according to claim 10, wherein said user control enables said user to select one of a color map or a gray scale map to identify said sub-ranges.

12. A speech recognition system comprising:

a speech recognizer for translating speech into text, said text being one or more sentences, said speech recognizer comprising a confidence level scorer assigning one of a user selected number possible scores for each word of said one or more sentences;

a user interface for displaying said text in accordance with said scores, wherein said scores are mapped to a continuous range of colors, said each word being displayed in said mapped color, thereby providing a different color display for different respective words having different said scores; and a user control allowing a user to select a score threshold, scores beyond said score threshold being displayed with a default display property.

13. A speech recognition system according to claim 12, further comprising color maps for said range of colors, wherein said user of said speech recognition system selects one of said color maps.

14. A method of speech recognition comprising:

translating input speech into text, said text being one or more sentences;

assigning one of at least three possible confidence level scores for each word of said one or more sentences, said score being a confidence measure that said each word has been recognized correctly;

selecting by a user a number of score sub-ranges and a score limit; and displaying said text, each said word having one of at least three display properties corresponding to a score falling within one of said score sub-ranges or beyond said score limit, said display properties providing a visual indication of said confidence measure for said each word.

15. A method of speech recognition according to claim 14, wherein said at least three display properties include a default display property corresponding to scores beyond said score limit and two or more other display properties.

16. A method of speech recognition according to claim 15, wherein said default display property is normal text.

17. The method of speech recognition according to claim 15, wherein said one or more words is displayed with one of said two or more other display properties when said confidence measure of said one or more words is below said score limit.

18. The method of speech recognition according to claim 15, further comprising the step of:

displaying said each word with said default display property when said confidence measure is above said score limit.

19. A method of speech recognition comprising:

translating input speech into text, said text being one or more sentences;

assigning one of a user selected number confidence level scores for each word of said one or more sentences; and displaying said text, wherein said scores cause said each word to be displayed in accordance with one of a user selected number of indications, depending upon which of a plurality of sub-ranges each of said scores fall into, said sub-ranges being selected by said user.

20. The method of speech recognition according to claim 19, further comprising the step of:

providing a different color for each of said plurality of indications.

21. The method of speech recognition according to claim 19, further comprising the step of:

providing at least one different font attribute for each of said plurality of indications, said different font attribute being selected from the group consisting of font type, point size, bold, italics, underline, double underline, capitalization, flashing and blinking.

22. The method of speech recognition according to claim 19, further comprising the step of:

providing one of a different shade of a single color or a different shade of gray for each of said plurality of indications.

23. A method of speech recognition computer system according to claim 22, further comprising the step of:

said user selecting one of a color map or a gray scale map to identify said sub-ranges.

24. A method of speech recognition comprising:

translating input speech into text, said text being one or more sentences;

assigning one of a user selected number of possible confidence level scores for each word of said one or more sentences; and displaying said text in accordance with said scores, wherein said scores are mapped to a continuous range of colors, said user defining an upper confidence level being mapped to said continuous range, said each word being displayed in said mapped color, thereby providing a different color display for different respective words having different said scores.

25. The method of speech recognition according to claim 24, further comprising the step of:

selecting a color map for said range of colors.

26. A speech recognition system comprising:

a speech recognizer for translating speech into text, said text being one or more sentences, said speech recognizer comprising a confidence level scorer assigning a confidence level to each word of said one or more sentences;

a confidence level indicator assigning a confidence level indication color to said each word, said color being selected from a range of colors based on said assigned confidence level;

a user interface displaying said text, said each word being displayed with its assigned color, the confidence level of said each word being visually discernable; and a user control allowing a user to select said range of colors and confidence range limit.

27. A speech recognition system as in claim 26, wherein when said confidence level is above said confidence range limit, the assigned color is a default color.

28. A speech recognition system as in claim 26, wherein when said confidence level is below said confidence range limit, the assigned color is a color selected to indicate an error.

29. A method of speech recognition comprising:

translating input speech into text, said text being one or more sentences;

assigning a confidence level for each word of said text, a confidence level limit being selected by a user; and mapping said confidence level to a range of display attributes, said range including at least three display attributes the confidence level value subranges being mapped thereby and being user selectable; and displaying said text, wherein said each word is displayed with a corresponding mapped attribute, such that each word's confidence level is visually discernable.

30. A method as in claim 29 wherein said range of display attributes is a range of colors.

31. A method as in claim 29 wherein said range of display attributes is a range of font attributes.

* * * * *